United States Patent
Berman et al.

(10) Patent No.: US 6,667,774 B2
(45) Date of Patent: Dec. 23, 2003

(54) METHOD AND APPARATUS FOR THE AUTOMATIC GENERATION OF SUBJECT TO BACKGROUND TRANSITION AREA BOUNDARY LINES AND SUBJECT SHADOW RETENTION

(75) Inventors: Arie Berman, Chatsworth, CA (US); Paul Vlahos, Tarzana, CA (US); Arpag Dadourian, Northridge, CA (US)

(73) Assignee: iMatte, Inc., Chatsworth, CA (US)

( * ) Notice: Subject to any disclaimer, the term of this patent is extended or adjusted under 35 U.S.C. 154(b) by 0 days.

(21) Appl. No.: 10/008,868

(22) Filed: Nov. 2, 2001

(65) Prior Publication Data

US 2003/0086018 A1 May 8, 2003

(51) Int. Cl.$^7$ .............................................. H04N 5/272
(52) U.S. Cl. ....................... 348/584; 348/586; 348/598; 382/167
(58) Field of Search ................................ 348/586, 584, 348/587, 598, 592, 590, 650, 252, 577, 625, 715; 382/167, 162, 163; 358/518, 520

(56) References Cited

U.S. PATENT DOCUMENTS

| | | | |
|---|---|---|---|
| 4,800,432 A | | 1/1989 | Barnett et al. |
| 5,812,214 A | * | 9/1998 | Miller ......................... 348/587 |
| 5,940,140 A | * | 8/1999 | Dadourian et al. ......... 348/587 |
| 6,134,345 A | * | 10/2000 | Berman et al. ............. 382/162 |
| 6,134,346 A | | 10/2000 | Berman et al. |
| 6,262,778 B1 | * | 7/2001 | Nonweiler et al. ......... 348/586 |
| 6,288,703 B1 | * | 9/2001 | Berman et al. ............. 345/600 |
| 6,301,382 B1 | * | 10/2001 | Smith et al. ................ 382/162 |
| 6,320,624 B1 | * | 11/2001 | Ayer et al. .................. 348/584 |
| 6,362,854 B1 | * | 3/2002 | Fierke et al. ............... 348/584 |
| 6,363,526 B1 | * | 3/2002 | Vlahos et al. ................ 725/37 |

* cited by examiner

Primary Examiner—Michael H. Lee
Assistant Examiner—Jean W. Désir
(74) Attorney, Agent, or Firm—Blakely, Sokoloff, Taylor & Zafman

(57) ABSTRACT

Changes in a current image frame from variations in room light level, and automatic camera adjustments, are determined and incorporated into a clear (reference) frame, thereby resulting in a zero difference in the background region when the clear frame and a current frame are subtracted. Any deviation from zero defines the beginning edge of a transition from background to subject. The location of the outer edge of a transition area is further refined by subtracting derivatives of the RGB signals in each frame, and by the use of a fourth color channel when available. The difference of derivitives ($d_{cu}-d_{cl}$) identifies the subject to background transition area, whose edges define the inner and outer boundary lines. Shadow areas on the backing are retained and may be transferred to the inserted background scene. Small areas on the backing having the same color and luminance as the subject are prevented from printing through the subject by a second "derivative" alpha channel for the small areas.

19 Claims, 4 Drawing Sheets

METHOD AND APPARATUS FOR THE AUTOMATIC GENERATION OF SUBJECT TO BACKGROUND TRANSITION AREA BOUNDARY LINES AND SUBJECT SHADOW RETENTION

BACKGROUND

In an image, a transition occurs between the edge of the subject and its background. This transition can be very narrow if the subject is sharply focused. However, lenses are not so sharp, nor subjects and cameras so still, that the transition will occur between two adjacent pixels in a digital image. The transition occurs over a minimum of at least three pixels, and up to the number of pixels comprising the width of the blurred edge of a moving or out-of-focus subject.

In motion picture and video applications, subjects are generally in motion. The resulting semi-transparency of blurred edges must be retained, but the contribution of the initial background seen through these blurred edges must be removed and replaced with the chosen background. Otherwise, any portion of the initial background remaining in the semitransparent edges becomes edge artifacts in the composite image.

The process described in U.S. Pat. No. 6,134,346, which has become known in the graphic arts industry as the Ultimate Knockout process, will be referred to as such in the subsequent discussion. This Knockout process for the graphics arts has reached such a level of perfection that many of those skilled in the art of compositing are not able to detect that the image they observe is a composite. However, Knockout requires two manually drawn boundary lines to define the subject-to-background transition area, and another outline at the perimeter of a shadow. The inner, outer, and shadow boundary lines are hand-drawn, using a cursor, close to the transition area without touching it. The requirement of hand drawn boundary lines has prevented the use of Knockout for motion picture and video applications.

The invention to be described makes possible the extension of the Knockout process to motion picture and video applications by automatically generating the transition area boundary lines, and by providing a modified clear frame containing shadow information.

U.S. Pat. No. 4,800,432 describes a "Video Difference Key Generator" that employs the subtraction of two images; the first image excludes the subject, while the second image includes the subject. Their difference creates a key signal. A key signal is a switch.

In a switching system there is no proper place to switch, since every pixel in the subject-to-background transition area contains both background and subject. In blurred subject edges, switching creates disturbing edge artifacts in the composite image. Switching does not occur in the Ultimate Knockout image compositing method. The contribution of the background to each pixel in the transition area is determined and removed by subtraction.

While the comparison of two images photographed at different times has been used successfully by military and government agencies to detect changes in the area photographed, it has not achieved much success in real time video because of edge artifacts and other problems. The importance of the difference principle in image compositing is that it does not require a colored backing or uniform illumination to detect a change between two images.

SUMMARY OF THE INVENTION

Changes in a current image frame from variations in room light level, and automatic camera adjustments, are determined and incorporated into a clear (reference) frame, thereby resulting in a zero difference in the background region when the clear frame and a current frame are subtracted. Any deviation from zero defines the beginning edge of a transition from background to subject.

The location of the outer edge of a transition area is further refined by subtracting derivatives of the RGB signals in each frame, and by the use of a fourth color channel when available.

The difference of derivitives ($d_{cu}$–$d_{cl}$) identifies the subject to background transition area, whose edges define the inner and outer boundary lines. These automatically generated inner and outer boundary lines permit the use of the Ultimate Knockout Process in motion picture and video image compositing.

Shadow areas on the backing are retained and may be transferred to the inserted background scene. Small areas on the backing having the same color and luminance as the subject are prevented from printing through the subject by a second "derivative" alpha channel for said small areas.

DETAILED DESCRIPTION OF THE INVENTION

Spectral Regions

In an image, one object is distinguished from another by their difference in color or luminance or both. However, it would not be unusual for the white shirt of a person writing on a White Board to have his white shirt match the white of the white board in both luminance and color (hue). In this case the difference matte is defeated in its attempt to separate the subject from its background. However, since a shirt and a white board are made of different materials, there is a high probability they will differ in either their infrared or ultra violet reflection. The need for using more than the RGB parts of the spectrum may not occur frequently, but a fourth channel significantly improves subject edge detection. A fourth and fifth channel are treated as a fourth and fifth color in both the clear frame and the current frame. Boundary lines are simply a series of addresses whether generated by visible or invisible portions of the spectrum.

The method for generating the inner and outer boundary lines encompassing the background-to-subject transition area is not limited to any specific number of spectral zones. For simplicity, the colors Red, Green and Blue will be used hereafter in describing the method for automatically generating these boundary lines.

Figure 1:
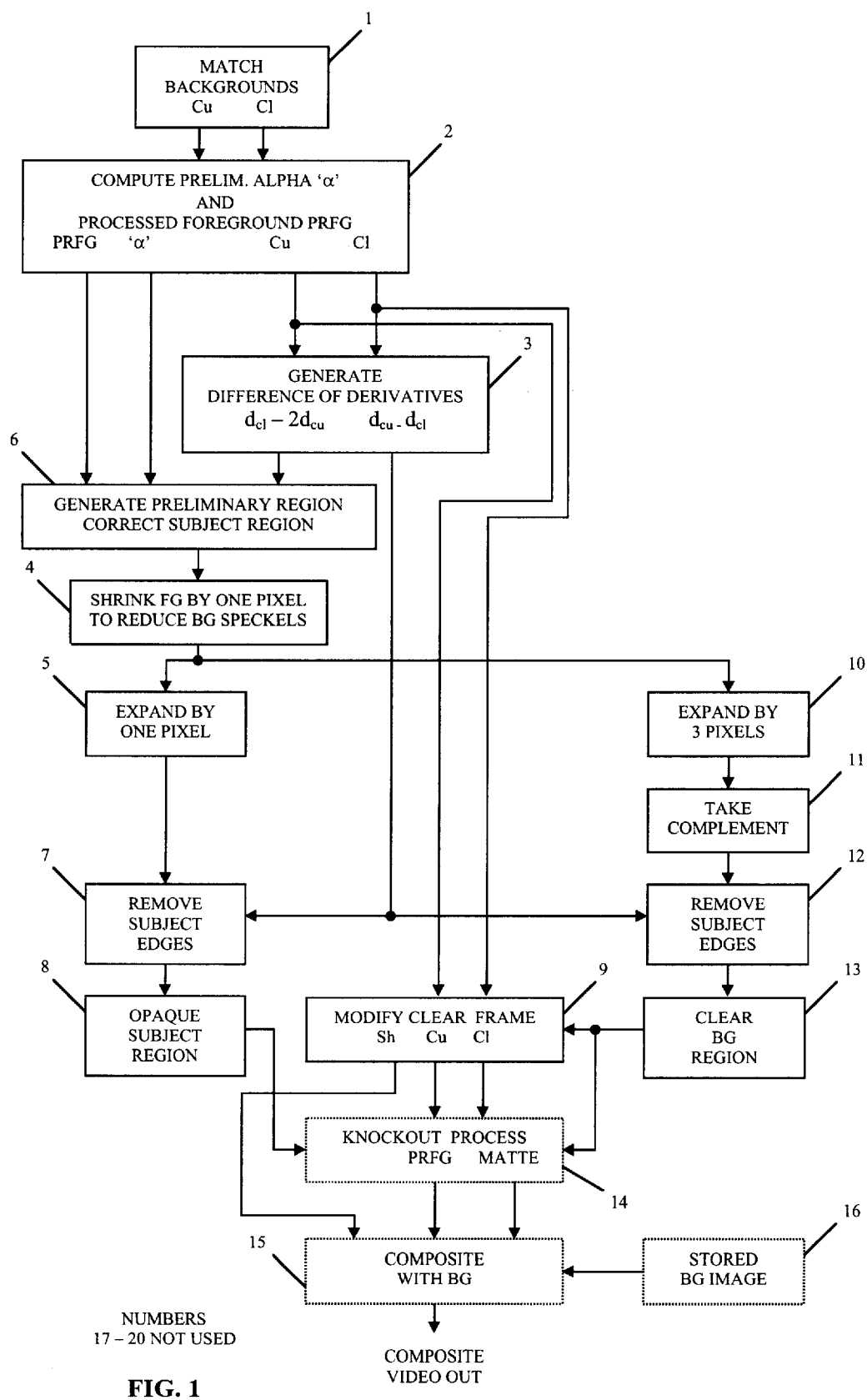
FIG. 1 is a block diagram of one embodiment of the new invention identifying the steps in the process of automatically generating inner and outer boundary lines.

FIG. 1 is the block diagram of one embodiment of the invention identifying the steps in the process of automatically generating inner and outer boundary lines at the inner and outer edges of the subject-to-background transition area. Each step is described and explained as follows:

Upper case letters R G B identify red, green and blue signals in the clear frame. A clear (cl) frame is an image frame in which all foreground subject matter is cleared from camera view. Lower case letters r g b identify signals in a current (cu) frame that includes the subject.

Matching Backgrounds

A number of factors can cause the rgb levels in the background of the current frame to differ from the RGB levels in the previously stored clear frame, including: a change of line voltage on the set lighting lamps; interference beat or modulation from standard fluorescent lamps; and scene balancing adjustments that are performed automatically within the video camera such as automatic iris, automatic gain and automatic black offset.

At any moment during a scene, the line voltage powering set lighting lamps can change due to other users on the same power grid adding to, or reducing, their electrical power load.

The change in luminance and color from light level changes, and automatic camera adjustments creates the need for corrections to the clear frame so that it will continue to track and match the rgb background levels in the current frame. These matched background signal levels result in a subject detection threshold no higher than the level of camera noise and digitizing errors.

The above preliminary corrections are made for each frame, but are also effective when made at intervals of two or more frames.

Illumination and Color Correction

Figure 2:
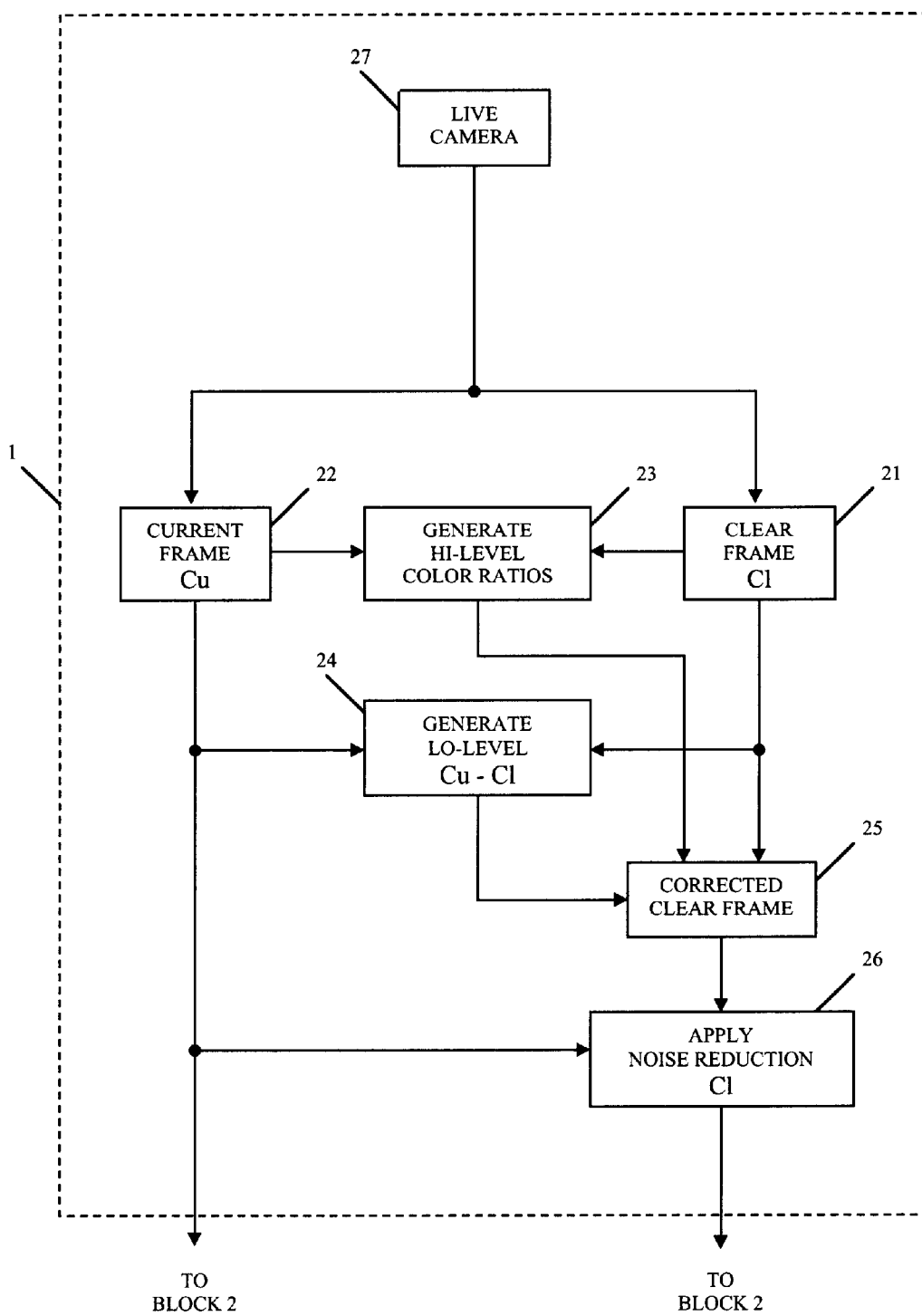
FIG. 2 is a block diagram showing the generation of color and luminance corrections to the clear frame so as to match the background area of a current frame.

FIG. 2 is a block diagram showing the steps used to obtain a preliminary match of luminance and color between the clear frame and the current frame. Referring to FIG. 2, item 21 is a clear frame memory loaded with the RGB levels of all pixels in the scene with subject absent. Item 22 is a memory loaded with the rgb levels of all pixels in the current frame with subject present. Both memory 21 and memory 22 are connected to comparator 23 where counters and accumulators identify those areas having high counts of consistent ratios r/R, g/G and b/B in high luminance areas. On a scale of 0–255 any pixel whose r, g, or b level exceeds a selected level (e.g. 100), is considered high luminance, while pixels where the larger of its r, g, or b levels does not exceed a selected lower level (e.g. 50) is considered low luminance.

High Luminance Correction

Within a very small threshold, the ratio r/R will be the same ratio for all pixels in the background area unobscured by the subject, and outside of the subject's shadow. This threshold must be wide enough to accommodate digitizing errors and camera noise, but small enough to include very little of the subject.

The ratios r/R, g/G, b/B, if different from 1.0, represent the change in luminance and color that has occurred on the background area of the current image since the clear frame was last corrected. The above ratios permit a luminance and hue correction to be made to the clear frame so that it will match the luminance and color of the current frame in the background area. The above color ratios are determined only for the high luminance areas of the background.

A working assumption is made that the most consistent (common) ratio value range will consist of the ratios between corresponding pixels in the background region. Determining this "most consistent" value range, and hence the area of the image that does not include the subject, is done by a process called histogramming.

A voltage increase on an incandescent lamp causes its light to become a little bluer, or a little redder if voltage decreases. The color ratios r/R, g/G and b/B may therefore differ from each other. Corrections are therefore made separately for each color.

The effect of camera noise and digitizing errors is reduced by averaging all the r/R, g/G, b/B ratios within the above determined background area. Rather than averaging the ratios themselves, the logs of the ratios can be averaged, yielding the log of the representative ("average") ratio. The antilog "average", derived from averaging the logs, is a more accurate representative of the color component ratio. The averaged ratios as determined above are independently multiplied by the r g b levels of all pixels in the clear frame, and their product is stored in a separate clear frame memory in item 25. The original clear frame is not altered.

Low Level Offset Correction

Automatic adjustments made by video cameras are based on the content of the scene. Such adjustments can affect the cameras' black level. It is essential to maintain the same black level in the clear frame as the black level in the current frame.

Both clear frame RGB, in clear frame 21, and current frame rgb, in current frame 22, are connected to generate lo-level 24. Whereas generate hi-level 23 computes ratios for high luminance areas, generate lo-level 24 computes differences only for those parts of the background having low levels of luminance.

The RGB levels of pixels in low luminance areas (e.g. below 50) are compared with the same areas in the current frame. This comparison provides differences r-R, g-G, and b-B. Counters and accumulators in item 24 determine the low luminance areas in the background having the most consistent difference (as was done before for ratios).

The selected, most consistent difference is added to the RGB levels of all pixels in the clear frame to result in an offset of zero for the darkest areas of the scene. While the offset returns a match of background levels for dark areas, it may introduce an unwanted and incorrect offset in high luminance areas. Therefore, the low luminance correction must be made first, followed by the ratio correction for high luminance areas. The ratio correction will not change black levels.

The clear frame background area, having been corrected in both high and low luminance areas in corrected clear frame 25, is routed to noise reducer 26. Because of the nearly perfect match in backgrounds achieved by luminance and color correction, any remaining mismatch is primarily due to camera noise which is camera dependent. Noise reducer 26 sets an operator selected subject detection threshold approximately equal to camera noise which is typically below 5 on a scale of 0–255.

Preliminary Alpha ($\alpha$)

The term "alpha", as defined in the context of an image having a foreground subject seen against a background, is a linear measure of the percent visibility of the background, and is therefore 1.0 (100%) in the unobscured background area, and 0.0 in the opaque subject area. Alpha tapers from 1.0 to 0.0 across the transition area from background to subject. The terms alpha "$\alpha$" and Matte "M" are used interchangeably, with "Matte" being used in the earlier literature and patents.

Utilizing the corrected clear frame, and a current frame, a preliminary alpha $\alpha$ is computed in compute preliminary alpha 2 (FIG. 1) according to the following equation.

$$\alpha = \min[r/R,\ g/G,\ b/B,\ (1-r)/(1-R),\ (1-g)/(1-G),\ (1-b)/(1-B),\ 1] \qquad \text{Eq.-1}$$

where RGB=clear frame, and rgb=current frame. Of the six ratio terms above, a ratio term having a denominator smaller than a set threshold is not used thereby preventing the introduction of noise.

This preliminary α can be augmented or replaced by a difference α, which is the absolute difference between the current frame and the clear frame (1−|rgb−RGB|). Augmenting consists of an alpha that is the minimum alpha derived by both the ratio and difference methods.

Preliminary Processed Foreground (pfg) and Transition Area

A Processed Foreground (pfg) is the subject in full color against a black background. The following equations 2, 3 and 4 remove the background, and remove the rgb contribution of the background to pixels in the transition area in accordance with the preliminary alpha, while leaving the foreground contribution undisturbed.

For each pixel;

$$r_{pfg}=r-\alpha \cdot R \text{ if } r_{pfg}<0, \text{ reset to } 0 \qquad \text{Eq.-2}$$

$$g_{pfg}=g-\alpha \cdot G \text{ if } g_{pfg}<0, \text{ reset to } 0 \qquad \text{Eq.-3}$$

$$b_{pfg}=b-\alpha \cdot B \text{ if } b_{pfg}<0, \text{ reset to } 0 \qquad \text{Eq.-4}$$

Where α is defined above in Eq. 1.

Preliminary Assignment of Pixels

The processed foreground can be used to define a subject and transition region which does not include the shadows cast on the background. This region is defined as follows: If $\max\{r_{pfg}, g_{pfg}, b_{pfg}\}>pfg_{th}$ (where $pfg_{th}$ is some small threshold e.g. 5/255), then the given pixel is in the subject or transition region. However, this comparison by itself does not define the entire subject and transition region.

A black pixel in the subject area will also have a zero processed foreground, and as such will not be identified as subject by the above processed foreground test. Such a black subject pixel is not distinguishable from a very dark shadow, and in general, the distinction between subject or transition and shadow becomes muddy for dark areas. Therefore, another condition is added, based on the assumption that the shadows encountered will not be extremely dark, whereas the subject might include some very dark colors. If $\alpha \leq \alpha_{th}$ (where $\alpha_{th}$ is some small threshold approaching zero), then the given pixel is in the subject or transition region.

Any pixel that meets either of these two conditions (on processed foreground or on preliminary alpha), is in the subject or transition region. All other pixels are in the background region.

A Preliminary One Bit Pixel Level Assignment

FIG. 1, item 6, is a full frame of pixels assigned a 0.0 for pixels in the background (Bg) region, and a 1.0 for pixels in the foreground (Fg) region. The Fg region includes the subject area and also the subject-to-background edge transition area. The background region includes the clear (unobscured) background area and any shadow area that may occur on the background. This one-bit signal assignment when viewed on a monitor is a white silhouette (1.0) in the subject region, against a black field (0.0) in the background region. This one bit pixel assignment facilitates the process of accurately locating the inner and outer boundary lines.

Using the Difference of Derivatives ($d_{cu}-d_{cl}$)

Figure 3:
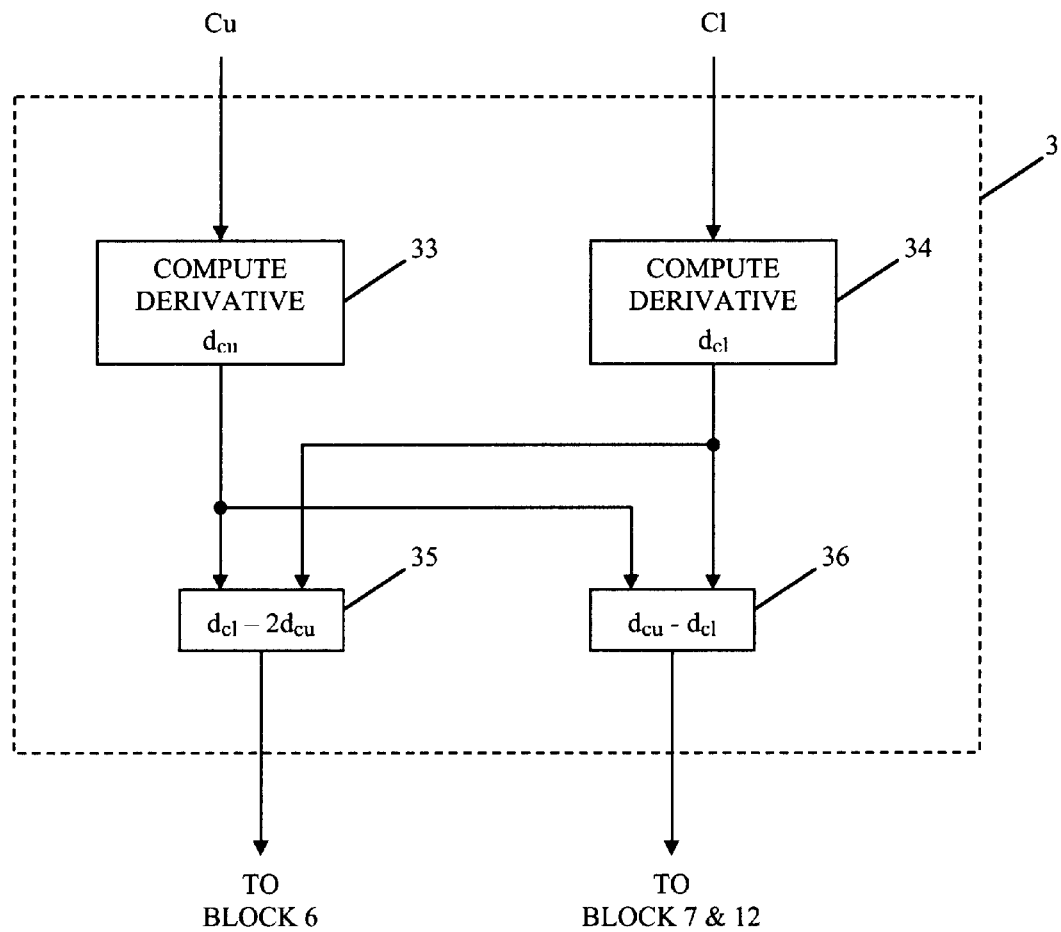
FIG. 3 is a block diagram showing the generation of derivatives of clear frame and current frame images to improve the detection of the edge of a transition area, to generate an estimate of its width, and to correct the assignment of opaque subject and clear background regions.

The preliminary assignment of pixels to the subject region is further improved by using the difference of derivatives of the current and clear frames. The advantage of using the difference of the derivatives becomes more apparent when the subject color and luminance is very close to that of the background color. In these instances luminance and color difference and the preliminary alpha may fail to assign these areas to the appropriate regions. The process of generating the difference of derivatives is shown in FIG. 3.

The derivative 34 of the corrected clear frame is subtracted from the derivative 33 of a current frame and the difference replaced with zero if negative. A positive output from subtracter 36 is a series of lines indicating a subject's edges, or luminance changes on the subject or his wardrobe.

The derivative of the current frame and clear frame is obtained for each pixel by looking at a 3×3 matrix of nine pixels of which the current pixel is the center pixel. For each of the colors r g b, the smallest value in said 3×3 matrix is subtracted from the largest value in said 3×3 matrix to obtain their difference. The derivative of the pixel at the center of said matrix is said difference as shown in the equations below.

$$d_r=(r \text{ max})-(r \text{ min})$$

$$d_g=(g \text{ max})-(g \text{ min})$$

$$d_b=(b \text{ max})-(b \text{ min})$$

The above process is repeated for each pixel in the image. The difference 36 of ($d_{cu}-d_{cl}$), when above a selected threshold, identifies the presence of a subject's edge. The selected threshold is set just above noise level.

In the preliminary assignment of pixels, if a given pixel has been assigned 0.0 (Bg), and the difference of the derivatives 36 is greater than the detection threshold, then this pixel contains at least some small subject contribution. It is therefore in the foreground region, and the 0.0 (Bg) assignment is changed to 1.0 (Fg).

Subtractor 35 of FIG. 3, subtracts twice the level of $d_{cu}$ from $d_{cl}$. If the difference $d_{cl}-2d_{cu}$, is greater than some preselected threshold, then the differential $d_{cl}$ represents a sharp edged object in the background hidden behind the subject. If this pixel was originally assigned to the background region (0.0), its assignment is changed to 1.0, the subject region. This pixel reassignment also prevents print-through of small areas in the background behind the subject that match color and luminance in the foreground. In the expression ($d_{cl}-2d_{cu}$), the constant "2" may be replaced by a constant larger or smaller than "2".

All of the steps above are directed to identifying the foreground (FG) subject region, and to better define the beginning edge of the transition from the background to the subject. A fourth channel, if available, is useful in improving the sensitivity and reliability of detecting the FG subject and its transition, and would utilize all of the steps used by the rgb signals.

Noise Reduction

In the determination of whether a pixel is a 1 or a zero within very small thresholds, system noise will occasionally generate a one in a field of zeros. This discrimination failure causes a few pixels to become white specks in an otherwise black field. These specks can be removed by substituting the smallest value of a 3×3 matrix of nine pixels, for the existing value of the current pixel, which is the center pixel of the matrix. Shrink Fg by one pixel 4, also shrinks the subject (white area) by one pixel.

The white area is expanded to its original size in remove subject edges 5, by a single pixel, by examining a 3×3 matrix with the center pixel being the current pixel. The current pixel is assigned a zero if all nine pixels are zero, and is assigned a 1.0 if any of the nine pixels is not zero. The 3×3 matrix not only expands the subject area by one pixel but also eliminates any black specks in the subject area.

The Inner Boundary Line

Any pixel whose difference of derivatives ($d_{cu}-d_{cl}$) is above the noise threshold will contain at least a small contribution from the foreground subject and is therefore a transition area pixel. This transition pixel was previously assigned a 1.0 (white) while defining the "foreground or "subject and transition" region. Now, in seeking the "inner boundary line", a subject region is defined which does not include the transition. This is done by removing from the "foreground" region, (by assigning a zero) any pixel whose difference of derivatives ($d_{cu}-d_{cl}$) is above the noise threshold.

The reassignment of transition pixels from 1.0 to 0.0 provides a black region that includes the background and the transition area, leaving the opaque subject as a white silhouette against a field of black in opaque subject region 8 of FIG. 1. The pixel addresses at the edge of this white silhouette is the Inner Boundary Line required by the Knockout process.

The Outer Boundary Line

In FIG. 1, shrink Fg by one pixel 4, the white (1.0) subject and transition region was shrunk by one pixel. The shrunken region is connected to expand by 3 pixels 10 where its white area is expanded by three pixels. The white area is expanded by assigning the center pixel of a 3×3 matrix a 1.0 if any of the nine pixels is not zero. The center pixel is assigned a zero if all nine pixels are zero. This matrix process expands the white area by one pixel, returning the subject region to its full size. Each repetition of this process expands the white area by one more pixel.

The number of pixels by which the subject is expanded in expand by one pixel 5 and expand by three pixels 10 can be set by the user. The complement 11 of this expanded region reverses the pixel assignment and defines subject and transition areas as pixels having a value of 0.0, and background area pixels to have a value of 1.0. A positive difference of ($d_{cu}-d_{cl}$), above a noise threshold, identifies the pixel as being in the transition area, and is therefore assigned a 0.0 if not already at 0.0, so as to remove subject edges 12 from the background region.

In the above process, all of the pixels in the background will be assigned a value of 1.0 (white), while all of the pixels in the transition and subject area will be assigned 0.0 (black). In FIG. 1, clear B6 regions 13, the background region is a field of white surrounding a black silhouette of the subject and transition area. The white field of the background region does not include any pixels in the transition area. The address of pixels at the edge of this white field, facing the black subject, is the location of the Outer Boundary Line required by the Knockout process.

Comprehensive Correction of the Clear Frame

As described earlier, with the aid of FIG. 2, full frame (global) corrections were made to the clear frame to correct for global changes such as room light level changes, and automatic camera adjustments. These corrections create a very close match between the clear frame and the current subject frame in common areas clear of the subject. The logic of these corrections, FIG. 2, does not accommodate changes that do not uniformly affect the entire image frame. The subject's shadow is an example of a non-global change to the background.

To elaborate further, the presence of a subject alters the image not only by obscuring portions of the scene depicted in the clear frame, but also in some more subtle ways. For one, the subject reflects some light onto other elements of the background scene. The colors of the subject will then slightly influence the color of these other elements. Secondly, the subject obscures some of the light, both direct and indirect (i.e. reflected from other objects), which reduces the light shining on some portions of the scene, creating the appearance of a shadow, but which can also alter the color of the lighting, depending on which lights were obscured by the subject. Also, automatic color adjustments of the camera are affected by the presence of the subject, and might not be completely corrected by the single correction factor and offset estimated in the preliminary color correction.

Of these "subtle" changes to the background scene, the shadow is the most obvious and familiar, and is generally considered as a change in brightness only, even though in fact it can well be accompanied by changes in color.

Regardless of the reasons or the underlying mechanisms, there are observable non-uniform discrepancies between the clear frame and the background component of the current frame in both brightness and color, which are not corrected by the simple global adjustments of our preliminary color correction. A method for effectively correcting these non-uniform discrepancies is presented in the following paragraphs.

The current frame normally includes the subject and will include the subject's shadow when the subject is close enough to the background. The outer boundary line surrounding the subject was determined earlier. On a copy of the current frame, an interpolation is performed from the outer boundary line surrounding the subject, across the subject to the outer boundary line on the other side of the subject. The interpolation process removes the subject by replacing it with the interpolated rgb levels found on the outer boundary line on opposite sides of the subject.

This interpolated current frame includes the subject's shadow. In the event the subject's shadow extends into any part of the outer boundary line, the r g b signal levels of that portion of the outer boundary line will be interpolated across the transition area toward the opposite boundary.

Figure 4:
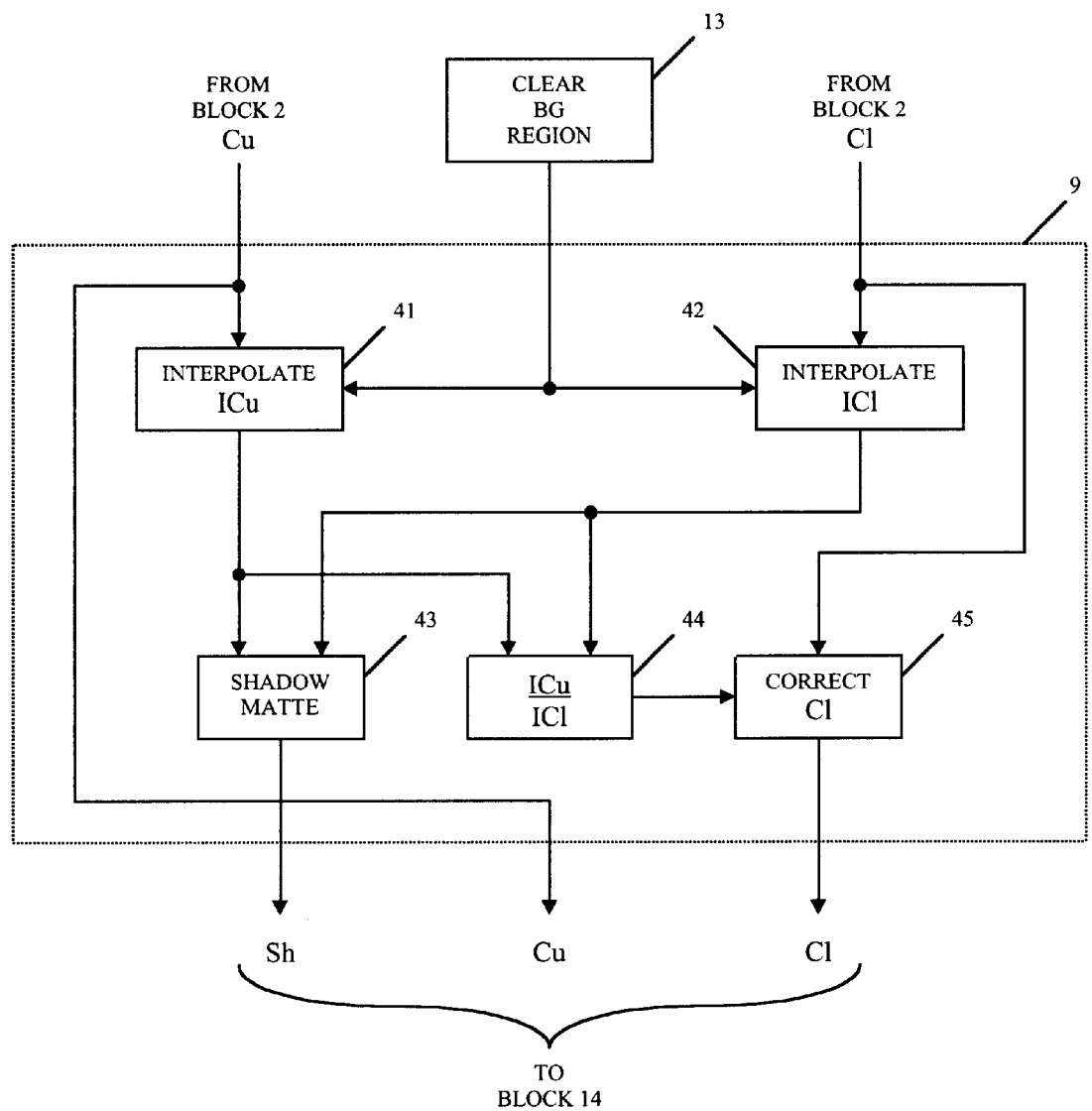
FIG. 4 is a block diagram showing the details of a second modification of the clear frame to obtain a better match to the current frame in the area between the subject and the outer boundary line. Additionally, a shadow matte is generated to control the density of the subject's shadow in the final composite.

The interpolated current frame 41 ($I_{cu}$) is shown in FIG. 4. It includes the background information outside the outer boundary line, the subject's shadow (if any) and the interpolated area formerly occupied by the subject. Except for the presence of lighting variations induced by the subject, such as the shadow, the interpolated current frame looks very much like the clear frame, and may be identified as a synthetic clear frame.

The same interpolation process is applied to a copy of the clear frame, across the same bounded area as used for the current frame, to generate the interpolated clear frame $I_{cl}$, 42, is shown in FIG. 4. The interpolated clear frame $I_{cl}$ looks very much like the un-interpolated clear frame, except that the interpolation process eliminates any detail in the background within the area bounded by the subject's outer boundary line. Using $I_{cu}$ and $I_{cl}$, correction factors are generated to correct each pixel in the clear frame Cl so that it matches the rgb levels of the estimated background component of the corresponding pixel in the current frame. These correction factors ($I_{cu}/I_{cl}$), are generated for each color component of each pixel in the clear frame, as shown in equations 5, 6, and 7:

$$Cr = I_{cu}r/I_{cl}r \qquad \text{Eq. 5}$$

$$Cg = I_{cu}g/I_{cl}g \qquad \text{Eq. 6}$$

$$Cb = I_{cu}b/I_{cl}b \qquad \text{Eq. 7}$$

Because of the interpolation process, neither the interpolated clear frame, nor the interpolated current frame contains details of what is in the background behind the transition area. That information, however, is found in the un-interpolated clear frame. The color correction factors, Eq. 5, 6, and 7 may be used (by multiplication) to correct the un-interpolated clear frame, cl 45, to match the current frame.

Equations 8 or 9 determine the shadow density, as a percentage of full luminance, for each pixel in the shadow area. An Sh of 1.0 indicates no shadow. An Sh of 0.3 is a medium shadow at 0.30 luminance.

$$Sh=(I_{cu}r+I_{cu}g+I_{cu}b)/(I_{cl}r+I_{cl}g+I_{cl}b), \quad \text{Eq.-8}$$

or, $$Sh=\min\{(I_{cu}r/I_{cl}r), (I_{cu}g/I_{cl}g), (I_{cu}b/I_{cl}b), 1.0\}, \quad \text{Eq. 9}$$

The shadow (Sh) is the density of the original shadow. A composite image with a new background, being either lighter or darker, would likely achieve a better aesthetic balance by adjusting shadow density. The shadow matte density control (K) of equation 10 may be used to provide full control of shadow density.

$$Sh \text{ matte}=1-K(1-Sh). \quad \text{Eq. 10}$$

If Sh matte<0.0, set Sh matte to 0, where K is a user adjustable shadow density control ranging from 0.0 (no shadow) to some positive value, depending on how dense a shadow is desired.

The Knockout Interface

U.S. Pat. No. 6,134,346 provides a full explanation of the Knockout process 14 of FIG. 1. The outputs from the Knockout process are a Matte signal, and a Processed Foreground signal as shown in FIG. 1.

As explained in the above referenced U.S. Pat. No. 6,134,346, a subject reference frame is generated by extrapolating (smearing) the RGB signal levels on the inner boundary line outward at least as far as the outer boundary line. A background reference frame is created by interpolation (or extrapolation) of the RGB signal levels on the outer boundary line inward at least as far as the inner boundary line.

In this invention, the background reference frame is not generated within the Knockout process; it is provided by the modified clear frame signal 45 of FIG. 4, because this signal correctly adjusts for the presence and density of shadows that may extend behind the transition area.

The RGB levels of a pixel in a current frame, and at corresponding addresses in the subject and background reference frames, become three points in a three dimensional color space from which the RGB contribution of the background is computed.

The percentage contribution of the background to any pixel in the image frame is the matte signal. Clear areas outside the outer boundary line have already been assigned a matte signal level of 1.0, and a matte signal level of 0.0 is assigned in opaque subject areas. The matte signal within the transition area, as determined by the Knockout process, varies from 1.0 at the outer boundary line and tapers to 0.0 at the inner boundary line. This taper may not be linear. These three matte segments: background, foreground, and transition area constitute the full matte signal.

When the matte signal is multiplied by the RGB signals in the modified clear frame, their product is the numerical RGB contribution of the original background to each pixel in the current frame. When this background contribution is subtracted from the current frame, the remainder is the subject in full color against a black field, and is identified as the Processed Foreground (PFG). The PFG and the Matte signal, together with the shadow matte signal, 43, are passed to a compositing function 15.

Background scenes, including charts, graphs, tables and images typically stored in a computer, 16, are also connected to the compositing function 15. A background scene multiplied by the Matte signal, and added to the PFG, becomes the finished composite image. The new background will show through semitransparent edges of the subject, as it should.

The matte signal generated by Knockout process 14 represents the transparency levels of the subject, (i.e. visibility of the background), but does not include information about the subject's shadow cast on the original background. The new background scene processed by this matte will not include any shadows cast by the subject. The shadow matte 43, generated by equation 8 or 9, is used to reinsert the background shadow onto the new background using equation 10.

When the shadow matte 43 is multiplied by the subject mat by Knockout process 14, the product will be a combined matte that has both subject transparency and shadow density information. This combined matte will insert the new background with the subject's shadow in place.

Implementation

All of the functions described above, and illustrated by the four figures, may be performed by a desk-top computer. For motion picture applications, a computer program would be the preferred implementation, since all image manipulation is now being done by computer in non-real time.

Generation of boundary lines in real-time, as required by television and other video applications, may be most economically achieved by hard wired components programmed to perform the algorithms specified herein. Such equipment is readily constructed using the XILINX field programmable gate arrays, to perform the specified algorithms.

We claim:

1. A method for compositing motion picture and video images by automatically generating inner and outer boundary lines on either side of a subject-to-background transition area comprising the steps of:
   a) storing in a first memory the signal levels of each signal channel comprising the signals at each pixel location in a clear image frame with a subject absent,
   b) storing in a second memory the signal levels of each signal channel comprising the signals at each pixel location in a current image frame with said subject in place,
   c) subtracting the signal levels of pixels in said clear image frame from signal levels of corresponding pixels in said current image frame to obtain their difference,
   d) storing in a third memory a 0.0 at all pixel addresses where said difference approximates zero, and storing a 1.0 for all remaining pixels to form a field of zeros in the background area and a field of ones in the subject and transition areas,
   e) defining an outer boundary line as the addresses of those pixels forming a continuous line of pixels having been assigned a 0.0 and located adjacent to pixels having been assigned a 1.0, thereby forming an outer boundary line on the background adjacent to the edge of the subject-to-background transition area,
   f) shrinking said outer boundary line inward to form an inner boundary line on the subject at a sufficient distance from said subject's edge to avoid including elements of the background, thereby automatically generating said inner and outer boundary lines.

2. The method of claim 1 in which the signal channels comprising the signals being stored in said clear frame and said current frame are red, green and blue.

3. The method of claim 1 in which the signal channels comprising the signals being stored for said clear frame and said current frame are at least one red, green, blue, infrared red and ultra violet.

4. The method of claim 1 in which signal levels of pixels in dark areas in the background of the current frame are subtracted from the signal levels of corresponding pixels in the clear frame to obtain a correction to the clear frame that will reduce to zero any black level offset introduced by automatic camera adjustments or changes in scene illumination.

5. The method of claim 4 in which said dark areas are pixels having signal levels below a predetermined level and are identified by counters and accumulators seeking the largest areas having consistent differences, with the average of said differences becoming said clear frame corrections.

6. The method of claim 1 in which RGB signal levels in high luminance areas in the background of the current frame are divided by RGB signal levels from corresponding pixels in the clear frame to obtain clear frame correction factors that will reduce to zero any difference in the RGB signal levels between pixels in the background of the current frame and corresponding pixels in the clear frame thus removing the effects of luminance and color changes caused by changes in scene illumination or automatic camera adjustments.

7. The method of claim 6 in which pixels in high luminance areas are defined as having an R,G or B signal above a predetermined level, and are identified by a histograming process that seeks the most consistent ratio values, which are then averaged to reduce the effect of random signal noise.

8. The method of claim 1 in which said inner boundary line on the opaque subject is spaced from the outer boundary line by the width of the transition area.

9. The method of claim 8 in which the width of the transition area at any point along the edge of the subject is the positive difference of the derivative of the clear frame subtracted from the derivative of the current frame, $d_{cu}-d_{cl}$, which defines the width and location of the transition area.

10. The method of claim 9 in which said derivatives of said clear frame and current frame signals are determined by substituting for the signals at the central pixel of a matrix of nine pixels the signal difference between the lowest and the highest signal levels of the nine pixels.

11. The method of claim 1 in which the difference obtained by subtraction of clear frame signals from current frame signals is considered to be zero when said difference is less than a selected threshold and where said threshold approximates the combined noise of the camera and digitizing process.

12. The method of claim 11 in which white specks (1.0) in a field of black (0.0), representing noise peaks exceeding said noise threshold, are removed by substituting the smallest value of a 3×3 matrix of nine pixels for the existing value of the current pixel, which is at the center of the matrix.

13. The method of claim 12 in which a one pixel shrinkage of the subject area, that occurred when removing said noise peaks, may be expanded by one pixel while simultaneously removing black specks in a white subject field by substituting for the central pixel of a 3×3 matrix a 1.0 if any of the nine matrix pixels is not zero.

14. The method of claim 1 in which the colors in a clear frame are conformed to the colors in the background of a current frame, including the background color component of transition areas in the current frame, by multiplying each pixel in the clear frame by a correction factor computed for each pixel position, said correction factor being a ratio of a pixel color from a synthetic clear frame $I_{cu}$ to a corresponding pixel color from an interpolated clear frame $I_{cl}$.

15. The method of claim 14 in which a representation of the luminance of each pixel in synthetic clear frame Icu is divided by a corresponding representation of luminance of a corresponding pixel in interpolated clear frame Icl, forming an estimate of shadow luminance for each pixel, said shadow luminance limited to 1.0.

16. The method of claim 15 in which said shadow area and density, Sh, is obtained by one of equations 8, 9 as follows;

$$Sh=(I_{cu}r+I_{cu}g+I_{cu}b)/(I_{cl}r+I_{cl}g+I_{cl}b) \qquad \text{Eq. 8.}$$

$$Sh=\min[(I_{cu}r/I_{cl}r),(I_{cu}g/I_{cl}g),I_{cu}b/I_{cl}b) \qquad \text{Eq.9.}$$

17. The method of claim 14 in which said clear (cl) frame is multiplied by the ratio $(I_{cu}/I_{cl})$ to form a corrected clear frame that includes shadows extending behind a subject's transition area, and said corrected clear frame constitutes a background reference frame.

18. The method of claim 1 in which the subtraction in step 1.c) and the assignments in step 1.d) are replaced by alternate methods of comparing the clear frame and the current frame to determine the foreground region, such as by computing a preliminary alpha and processed foreground and assigning a 1.0 to any pixel for which the preliminary processed foreground exceeds some low threshold, or for which the preliminary alpha is below another low threshold, and assigning a 0.0 to all other pixels, and where said preliminary alpha and said computation of said processed foreground and preliminary alpha comprise the following steps, a) estimating the similarity of colors between corresponding pixels in the clear frame and the current frame, on a scale ranging from 0.0 to 1.0, b) subtracting the product of the preliminary alpha and the clear frame color from the current frame color, forming said preliminary processed foreground.

19. A system for compositing motion picture and video images by automatically generating inner and outer boundary lines on either side of a subject-to-background transition area comprising:

a) a first memory for storing the signal levels of each signal channel comprising the signals at each pixel location in a clear image frame with a subject absent, b) a second memory for storing the signal levels of each signal channel comprising the signals at each pixel location in a current image frame with said subject in place, c) a comparator coupled to said first memory and said second memory for subtracting the signal levels of pixels in said clear image frame from signal levels of corresponding pixels in said current image frame to obtain their difference, d) a third memory coupled to said comparator for storing a 0.0 at all pixel addresses where said difference approximates zero, and storing a 1.0 for all remaining pixels to form a field of zeros in the background area and a field of ones in the subject and transition areas, e) means for defining an outer boundary line as the addresses of those pixels forming a continuous line of pixels having been assigned a 0.0 and located adjacent to pixels having been assigned a 1.0, thereby forming an outer boundary line on the background adjacent to the edge of the subject-to-background transition area, f) means for shrinking said outer boundary line inward to form an inner boundary line on the subject at a sufficient distance from said subject's edge to avoid including elements of the background, thereby automatically generating said inner and outer boundary lines.

\* \* \* \* \*